(12) United States Patent
Shida (10) Patent No.: US 9,100,082 B2
(45) Date of Patent: Aug. 4, 2015

(54) RADIO COMMUNICATION SYSTEM AND A REPEATER

(75) Inventor: Masaaki Shida, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 865 days.

(21) Appl. No.: 13/137,332

(22) Filed: Aug. 5, 2011

(65) Prior Publication Data

US 2012/0207065 A1  Aug. 16, 2012

(30) Foreign Application Priority Data

Feb. 15, 2011  (JP) .................................. 2011-030018

(51) Int. Cl.
| | |
|---|---|
| H04B 7/14 | (2006.01) |
| H04B 3/36 | (2006.01) |
| H04B 7/155 | (2006.01) |
| H04B 7/26 | (2006.01) |
| H04W 16/26 | (2009.01) |

(52) U.S. Cl.
CPC .............. *H04B 7/155* (2013.01); *H04B 7/2606* (2013.01); *H04W 16/26* (2013.01)

(58) Field of Classification Search
CPC .................................................... H04W 16/26
See application file for complete search history.

(56) References Cited

U.S. PATENT DOCUMENTS 5,812,933 A * 9/1998 Niki ................................ 455/16
2010/0284446 A1* 11/2010 Mu et al. ....................... 375/211

FOREIGN PATENT DOCUMENTS

| JP | 7-235898 A | 9/1995 |
| JP | 8-204620 A | 8/1996 |
| JP | 11-186943 A | 7/1999 |
| JP | 2004-328121 A | 11/2004 |
| JP | 2006-295433 A | 10/2006 |

OTHER PUBLICATIONS

Notification of Reason(s) for Refusal dated Dec. 17, 2013, with English translation.

* cited by examiner

*Primary Examiner* — Samina Choudhry
(74) *Attorney, Agent, or Firm* — McGinn IP Law Firm, PLLC.

(57) ABSTRACT

A radio communication system for a communication between a base station and a mobile terminal. The radio communication system repeats a signal transmitted from the base station at repeaters that are multistage-connected by a leaky coaxial cable. Each repeater converts a frequency of an input signal into a different frequency and outputs the frequency-converted signal to the leaky coaxial cable connected to the repeater. The repeaters are provided between the leaky coaxial cables connected in series.

7 Claims, 5 Drawing Sheets

RADIO COMMUNICATION SYSTEM AND A REPEATER

The present application is based on Japanese Patent Application No. 2011-030018 filed on Feb. 15, 2011, the entire contents of which are incorporated herein by reference.

BACKGROUND OF THE INVENTION

1. Field of the Invention

The present invention relates to a radio communication system and a repeater, more particularly, to a radio communication system, which repeats a signal transmitted from a base station by a repeater that is multistage-connected by a leaky coaxial cable (LCX) and communicates with a mobile terminal.

2. Related Art

In the field of a train radio communication and a PHS (Personal Handy-Phone System) base station installed in metropolitan railway stations, a radio communication system using a leaky coaxial cable as antenna has been put into practical use. In such a leaky coaxial cable, a slit for leaking a radio wave is provided at an outer conductor of a coaxial cable.

The radio communication system using the leaky coaxial cable is advantageous in that only one transmitter can cover a long distance communication area and a stable communication can be realized even in an environment with a lot of metallic reflecting objects or obstacles. Furthermore, the radio communication system using the leaky coaxial cable is advantageous in that the communication area can be limited to a peripheral area of the leaky coaxial cable, so that the radio wave cannot be leaked to an unnecessary area, thereby realizing a high security.

Figure 10:
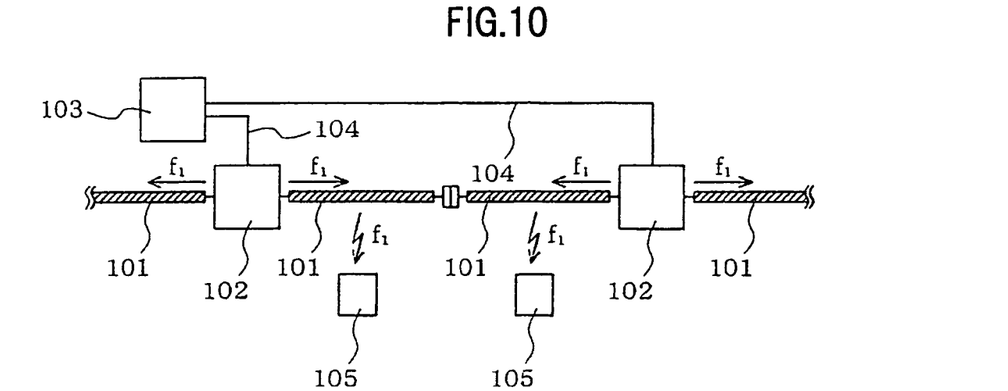
FIG. 10 is an explanatory diagram showing a structure of a conventional radio communication system using a leaky coaxial cable.

FIG. 10 shows a conventional radio communication system using the leaky coaxial cable. Referring to FIG. 10, a signal line 104 from a base station 103 is connected to each pre-amplifier 102 to which a leaky coaxial cable 101 is connected, and a communication is carried out between the base station 103 and a mobile terminal 105 via the leaky coaxial cable 101.

Figure 11:
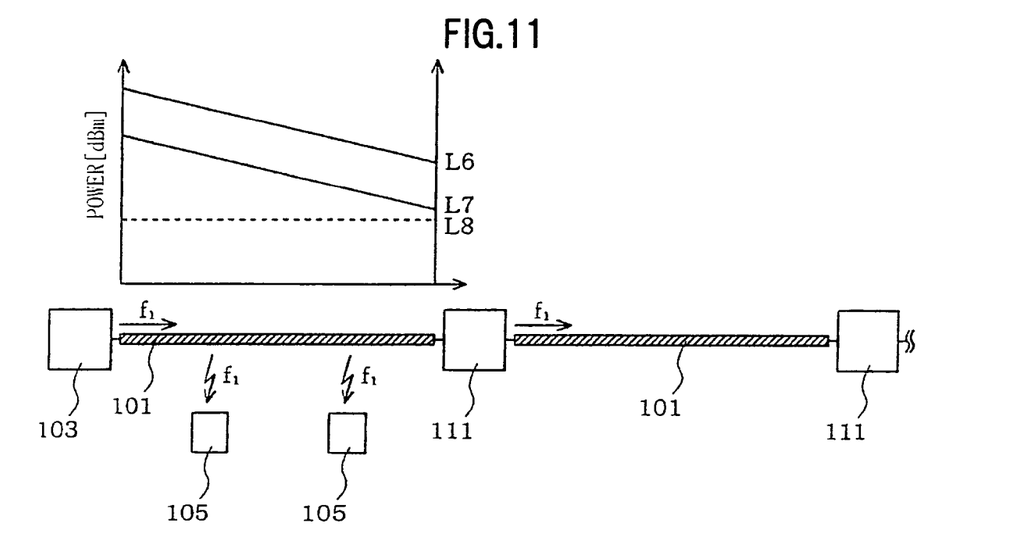
FIG. 11 is an explanatory diagrams showing a structure of another conventional radio communication system using a leaky coaxial cable including a graph showing the relationship between the power and the signal intensity.

FIG. 11 shows another conventional radio communication system using the leaky coaxial cable, in which a plurality of repeaters 111 are multistage-connected by leaky coaxial cables 101, and each of the repeaters 111 amplifies signal, thereby increasing a communication area. Referring to FIG. 11, the graph shows a relationship between a transmission distance of signals and an electric power (i.e. intensity of the signals), in which L6 indicates an intensity of signals transmitted from the base station 103 and propagated through the leaky coaxial cable 101, L7 indicates an intensity of received signals of a mobile terminal 105 located at a point distant from the leaky coaxial cable 101 with a predetermined distance, and L8 indicates a minimum receiver sensitivity of the mobile terminal 105.

In the structure shown in FIG. 10, it is necessary to transmit the signal to be transmitted from the base station 103 to each pre-amplifier 102 by another cable (a signal line 104) which is different from the leaky coaxial cable 101, so that two kinds of cables i.e. the leaky coaxial cable 101 functioning as an antenna and the signal line 104 are required.

On the other hand, in the structure shown in FIG. 11, the leaky coaxial cable 101 functions as both an antenna and a signal line, so that the number of components can be reduced. Therefore, it is possible to reduce the cost compared with the structure shown in FIG. 10.

Japanese Patent Laid-Open No. 2006-295433 (JP-A 2006-295433), Japanese Patent Laid-Open No. 11-186943 (JP-A 11-186943), and Japanese Patent Laid-Open No. 2004-328121 (JP-A 2004-328121) disclose examples of radio communication system using the leaky coaxial cable.

SUMMARY OF THE INVENTION

However, in the leaky coaxial cable, the signal is transmitted while leaking to the outside as the radio wave little by little. Therefore, the intensity of the signals propagated through the leaky coaxial cable is decreased in accordance with the increase in transmission distance, so that the intensity of the signals received by the mobile terminal is decreased, referring to the graph shown in FIG. 11.

A part of the signals transmitted from the base station and propagating through the leaky coaxial cable is emitted from the leaky coaxial cable, so that the received signal intensity of the mobile terminal distant from the leaky coaxial cable with a predetermined distance may be lower than minimum receiver sensitivity of the mobile terminal. For this case, it is impossible to carry out the communication between the leaky coaxial cable and the mobile terminal located at the point distant from the predetermined distance. Therefore, it is necessary to amplify the signals before the received signal intensity of the mobile terminal distant from the leaky coaxial cable with the predetermined distance becomes lower than the minimum receiver sensitivity of the mobile terminal.

Thus, a connection interval between the repeaters cannot be increased, so that the number of the repeaters is increased. As a result, it has been difficult to further reduce the cost required for a construction of the radio communication system.

Accordingly, an object of the present invention is to provide a radio communication system using a leaky coaxial cable, by which the connection interval between the repeaters can be increased, the number of the repeaters can be reduced, and the cost required for the system construction can be further reduced.

A feature of the invention provides a radio communication system for a communication between a base station and a mobile terminal, which repeats a signal transmitted from the base station at a repeater multistage-connected by a leaky coaxial cable, in which each repeater converts a frequency of an input signal into a different frequency, and outputs a frequency-converted signal to the leaky coaxial cable connected to the repeater.

In the radio communication system, the mobile terminal may convert a received signal into a base band signal.

In the radio communication system, the mobile terminal may convert a received signal into a base band signal and transmits a signal with a frequency different from a frequency of a signal to be repeated, and when a signal transmitted from the mobile terminal is input to the repeater, the repeater may output the input signal without converting a frequency to the leaky coaxial cable on the side of the base station.

In the radio communication system, the mobile terminal may convert a received signal into a base band signal and transmits a signal with a frequency same as a frequency of the received signal, and when a signal transmitted from the mobile terminal is input to the repeater, the repeater may convert a frequency of the input signal to a different frequency, and outputs a frequency-converted signal to the leaky coaxial cable on the side of the base station.

Another feature of the invention provides a repeater repeating a signal for a communication between a base station and a mobile terminal, which is provided between leaky coaxial cables connected in series from the base station, converts a frequency of a signal input from any of the leaky coaxial cables to a different frequency, and outputs a frequency-converted signal to any of the leaky coaxial cables.

The repeater may comprise:

a first duplexer connected to a leaky coaxial cable on a side of the base station, which electrically separates a signal input from the leaky coaxial cable on the side of the base station from a signal to be output to the leaky coaxial cable on the side of the base station;

a first amplifier connected to the first duplexer;

a frequency-converting circuit connected to the first amplifier, which converts a frequency of an input signal into a different frequency and outputs a frequency-converted signal;

a second amplifier connected to the frequency-converting circuit; and a power divider connected to the second amplifier, which divides an input signal and outputs divided signals to plural paths.

The repeater may further comprise:

a second duplexer connected to an output port of the power divider, which electrically separates a signal input from a leaky coaxial cable on a side of a repeater at a post-stage from a signal to be output to the leaky coaxial cable on the side of the repeater at the post-stage;

a power combiner connected to an other output port of the power divider, which synthesizes signals supplied from plural paths; and a third amplifier connected to the power combiner, which amplifies an input signal and outputs to an amplified signal to the first duplexer.

In the repeater, the second duplexer may be connected to an input port of the power combiner, the second duplexer separates a signal transmitted and input from the mobile terminal, and the second duplexer outputs a separated signal to the leaky coaxial cable on the side of the base station without converting a frequency of the input signal via the power combiner, the third amplifier and the first duplexer.

The repeater may comprise:

a first circulator connected to a leaky coaxial cable on a side of the base station;

a first amplifier connected to the first circulator;

a first power divider connected to the first amplifier, which divides an input signal and outputs divided signals to plural paths;

a first frequency-converting circuit connected to an output port of the first power divider, which converts a frequency of an input signal into a different frequency and outputs a frequency-converted signal;

a second amplifier connected to the first frequency-converting circuit;

a second power divider connected to the second amplifier, which divides an input signal and outputs divided signals to plural paths;

a second circulator connected to an output port of the second power divider;

a first power combiner connected to the second circulator and an other output port of the first power divider, which synthesizes signals supplied from plural paths;

a second frequency-converting circuit connected to the first power combiner, which converts a frequency of an input signal into a different frequency and outputs a frequency-converted signal;

a second power combiner connected to the second frequency-converting circuit and an other output port of the second power divider, which synthesizes signals supplied from plural paths; and a third amplifier having an input port connected to the second power combiner and an output port connected to the first circulator.

The repeater may further comprise:

a fourth amplifier connected between the second circulator and the first power divider.

In the repeater, the first circulator may output a signal input from the leaky coaxial cable on the side of the base station to the first amplifier and outputs a signal input from the third amplifier to the leaky coaxial cable on the side of the base station, and the second circulator may output a signal input from the second power divider to the leaky coaxial cable on the side of the repeater at the post-stage and outputs a signal input from the leaky coaxial cable on the side of the repeater at the post-stage to the fourth amplifier.

In the repeater, the repeater may convert a frequency of a signal to be transmitted from the mobile terminal to the base station, which is input from the leaky coaxial cable, into a different frequency and outputs a frequency-converted signal, and the repeater may convert a frequency of a signal to be transmitted from the base station to the mobile terminal into a different frequency and outputs a frequency-converted signal.

A still another feature of the invention provides a radio communication system comprising:

a base station;

a mobile terminal which communicates with the base station; and repeaters multistage-connected by a leaky coaxial cable, each of the repeaters repeating a signal transmitted from the base station and converting a first frequency of the signal into a second frequency to be output to the leaky coaxial cable connected to the repeater.

(Points of the Invention)

In the present invention, the repeater converts a frequency of an input signal into a different frequency, and outputs a frequency-converted signal to the leaky coaxial cable connected to the repeater.

According to this structure, it is possible to provide a radio communication system, by which the connection interval between the repeaters can be increased, the number of the repeaters can be reduced, and the cost required for the system construction can be further reduced.

BRIEF DESCRIPTION OF THE DRAWINGS

Next, a radio communication system and a repeater in embodiments according to the invention will be explained in conjunction with appended drawings, wherein.

DETAILED DESCRIPTION OF THE EMBODIMENTS

Next, a radio communication system and a repeater in preferred embodiments will be explained in more detail in conjunction with the appended drawings.

The First Embodiment

A radio communication system in the first embodiment according to the present invention will be explained below.

(Radio Communication System 10)

Figure 1:
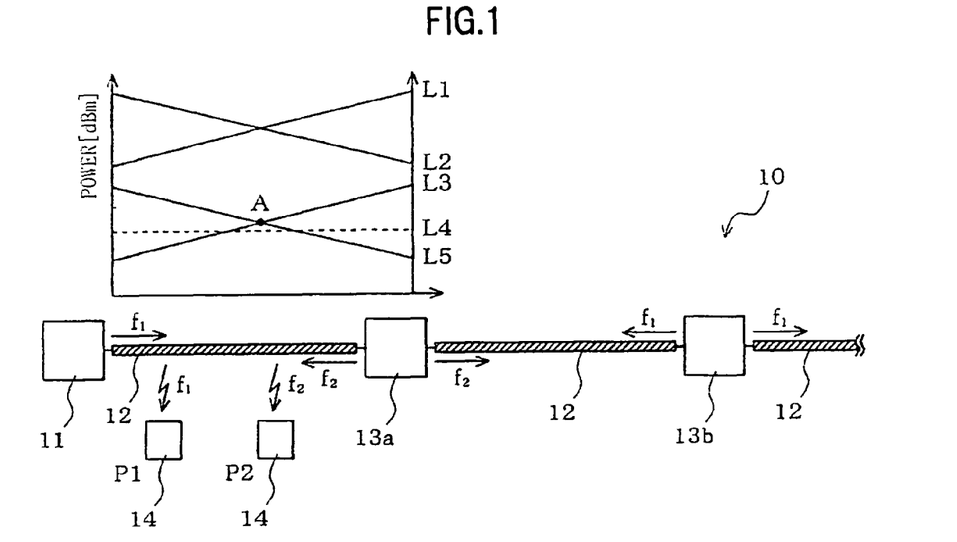
FIG. 1 is an explanatory diagram showing a structure of a radio communication system in the first embodiment according to the present invention including a graph showing a relationship between the power and signal intensity.

Referring to FIG. 1, a radio communication system 10 in the first embodiment repeats signals transmitted from a base station 11 at repeaters (first and second repeaters 13a, 13b in FIG. 1) that are multistage-connected by a leaky coaxial cable 12, and carries out communication between the base station 11 and a mobile terminal 14.

The base station 11 comprises a transmitter which transmits the signals. The communication is carried out between the transmitter and the mobile terminal 14 via the leaky coaxial cable 12 and the first and second repeaters 13a, 13b.

Each of the first and second repeaters 13a, 13b converts a frequency of an input signal to a different frequency and outputs a frequency-converted signal to the leaky coaxial cable 12 connected to each of the first and second repeaters 13a, 13b.

(The First and Second Repeaters 13a, 13b)

Figure 2:
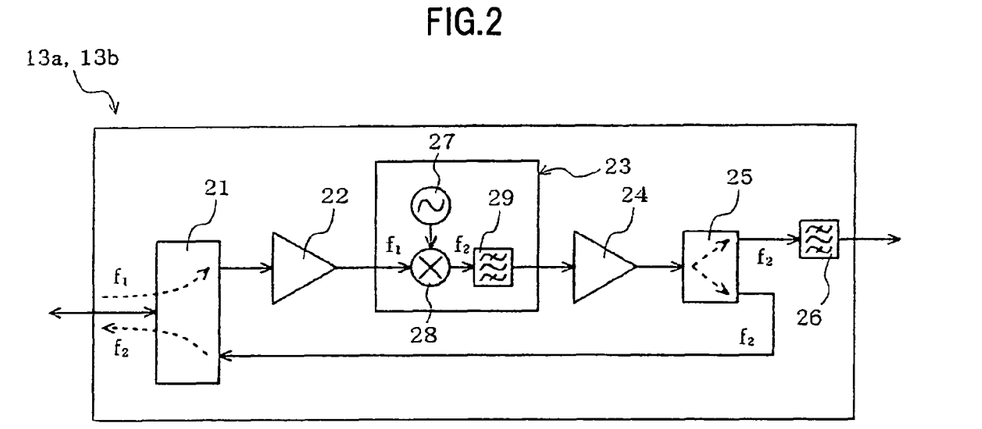
FIG. 2 is a circuitry diagram showing a structure of a repeater in the radio communication system of FIG. 1.

Referring to FIG. 2, each of the first and second repeaters 13a, 13b comprises a duplexer 21 connected to the leaky coaxial cable 12 on the side of the base station 11, an amplifier (first amplifier) 22 connected to the duplexer 21, a heterodyne circuit 23 connected to the amplifier 22, an amplifier (second amplifier) 24 connected to the heterodyne circuit 23, and a power divider 25 connected to the amplifier 24, and a band pass filter 26 connected to the power divider 25.

The duplexer 21 electrically separates a signal input from the leaky coaxial cable 12 on the side of the base station 11 from a signal output to the leaky coaxial cable 12 on the side of the base station 11.

Each of the amplifiers 22, 24 amplifies an input signal at a predetermined amplification rate and outputs an amplified signal.

The heterodyne circuit 23 converts a frequency of an input signal to a different frequency and outputs the signal with the different frequency. The heterodyne circuit 23 comprises a local oscillator 27, a mixer 28 to which signals are input from the amplifier 22 and the local oscillator 27, and a band pass filter 29 to which signals are input from the mixer 28.

The local oscillator 27 generates a local frequency signal. The mixer 28 outputs a sum of a frequency of the signal input to the heterodyne circuit 23 and the local frequency generated by the local oscillator 27, or a difference therebetween.

The band pass filter 29 removes signals with unnecessary frequencies and passes only the signal with a specific frequency.

In the heterodyne circuit 23, the mixer 28 mixes the signal input to the heterodyne circuit 23 with the signal generated by the local oscillator 27, so that the frequency of the signal input to the heterodyne circuit 23 is converted into the different frequency and only the signals with the specific frequency is output via the band pass filter 29.

The power divider 25 divides an input signal and outputs divided signals through two paths. The power divider 25 is connected to the leaky coaxial cable 12 at one output port via the band pass filter 26 and connected to the duplexer 21 at another output port.

The band pass filter 26 removes the signals with unnecessary frequencies and passes only the signal with a specific frequency, and removes the signals with frequencies other than the specific frequency from the signals propagating through the leaky coaxial cable 12, thereby preventing the input signal from an adjacent repeater connected to the leaky coaxial cable 12 on the side opposite to the base station 11.

In each of the first and second repeaters 13a, 13b, the signal input from the leaky coaxial cable 12 on the side of the base station 11 is separated by the duplexer 21 and amplified by the amplifier 22, and the frequency of the amplified signal is converted into the different frequency by the heterodyne circuit 23. The frequency-converted signal is amplified by the amplifier 24 and divided by the power divider 25. One part of the divided signals is output to the leaky coaxial cable 12 on the side of the base station 11 via the duplexer 21, while another part of the divided signals is output to the leaky coaxial cable 12 on the side of a repeater at a latter stage (post-stage).

For example, the first repeater 13a converts a frequency $f_1$ of a signal input from the leaky coaxial cable 12 on the side of the base station 11 into a frequency $f_2$, and outputs the signal with the frequency $f_2$ to the leaky coaxial cable 12 on the side of the base station 11 to the leaky coaxial cable 12 on the side of the repeater 13b at the post-stage, respectively.

On the other hand, the second repeater 13b converts the frequency f2 of a signal input from the leaky coaxial cable 12 on the side of the repeater 13a at a prior stage (pre-stage) into the frequency f1, and outputs the signal with the frequency f1 to the leaky coaxial cable 12 on the side of the repeater 13a at the pre-stage which is connected to the second repeater 13b and to the leaky coaxial cable 12 on the side of the repeater at the post-stage, respectively.

In other words, the first and second repeaters 13a, 13b alternately convert the signals transmitted from the base station into the frequencies f1 and f2 and repeat the signals.

The frequency f1 and the frequency f2 in FIG. 2 respectively indicate the frequency in each place in the first repeater 13a. In the second repeater 13b, the frequency of the input signal and the frequency of the output signal are opposite to those in the first repeater 13a. In other words, the frequencies f1 and f2 are opposite to the frequencies f1 and f2 in FIG. 2.

The mobile terminal 14 has a receiving function for receiving the signal transmitted from the base station 11 through the leaky coaxial cable 12, and converting the received signal into a base band signal.

(The Mobile Terminal 14)

Figure 3:
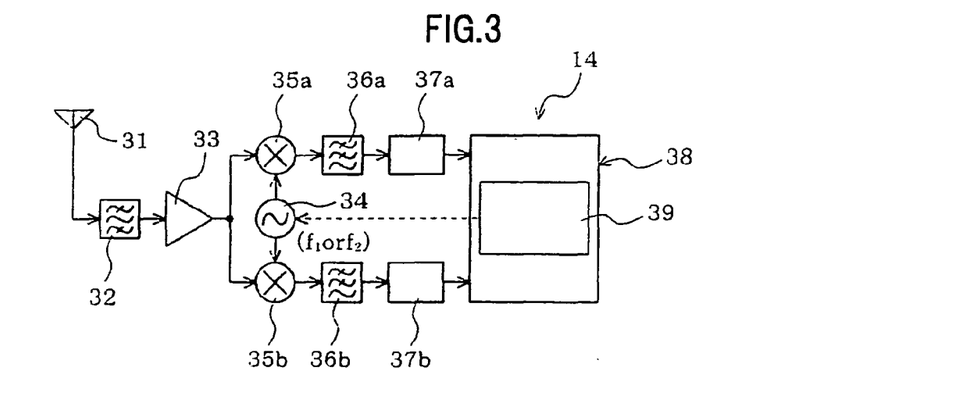
FIG. 3 is a circuitry diagram showing a structure of a mobile terminal in the radio communication system of FIG. 1.

Referring to FIG. 3, the mobile terminal 14 comprises an antenna 31, a band pass filter 32 connected to the antenna 31, an amplifier 33 connected to the band pass filter 32, a local oscillator 34, mixers 35a, 35b to which the signals are input from the amplifier 33 and the local oscillator 34, respectively, low pass filters 36a, 36b to which signals are input from the mixers 35a, 35b, respectively, A/D converters 37a, 37b connected to the low pass filters 36a, 36b, respectively, and a base band unit 38 connected to the A/D converters 37a, 37b, respectively.

The antenna 31 receives signals. The band pass filter 32 passes only a signal with a specific frequency among the signals received by the antenna 31.

The amplifier 33 amplifies an input signal at a predetermined amplification rate and outputs an amplified signal.

The local oscillator 34 generates local frequency signals. Each of the mixers 35a, 35b outputs a sum of the local frequency generated by the local oscillator 34 and a frequency of the signal input from the amplifier 33, or a difference therebetween.

Each of the low pass filters 36a, 36b removes high frequency band noise and passes only the base band signals.

The base band unit 38 comprises a frequency control circuit 39 which controls a local frequency of the signal generated by the oscillator 34. For example, the frequency control circuit 39 controls a local frequency of the signal generated by the oscillator 34 for the frequency $f_1$ or $f_2$.

In the mobile terminal 14, the band pass filter 32 passes only the signal with the specific frequency among the signals received by the antenna 31, and the passed signal with the specific frequency is amplified by the amplifier 33. The amplified signals are converted into the base band signals by the oscillator 34 and the mixers 35a, 35b, respectively, and the noise is removed from the base band signals by the low pass filters 36a, 36b, respectively. Thereafter, the base band signals are converted into digital signals by the A/D converters 37a, 37b, and the digital signals are processed by the base band unit 38.

For example, the mobile terminal 14 takes out only the signals with the frequencies f1 and f2, and converts the taken-out signals to the base band signals. Further, a certain processing is carried out based on the base band signals.

(Relationship Between the Transmission Distance of Signals and the Electric Power)

Referring again to FIG. 1, the graph shows a relationship between the transmission distance of signals and the electric power (i.e. intensity of the signals), in which L1 indicates an intensity of signals (with the frequency $f_2$) transmitted from the first repeater 13a and propagated through the leaky coaxial cable 12, L2 indicates an intensity of signals (with the frequency $f_1$) transmitted from the base station 11 and propagated through the leaky coaxial cable 12, L3 indicates a receiver sensitivity at the mobile terminal 14 for the signals (with the frequency $f_2$) transmitted from the first repeater 13a, L4 indicates a minimum receiver sensitivity of the mobile terminal 14, and L5 indicates a receiver sensitivity at the mobile terminal 14 for the signals (with the frequency $f_1$) transmitted from the base station 11.

In the radio communication system 10, if at least a junction A of L3 and L5 exceeds L4, the communication can be carried out between the leaky coaxial cable 12 and the mobile terminal 14 at any point between the base station 11 and the first repeater 13a. For example, the communication can be carried out at the frequency $f_1$ at a point $P_1$ which is closer to the base-station 11 than the first repeater 13a, and the communication can be carried out at the frequency $f_2$ at a point $P_2$ which is closer to the first repeater 13a than the base station 11.

In other words, in the conventional radio communication system shown in FIG. 11, if the intensity of the signals transmitted from the base station and propagating through the leaky coaxial cable is lower than the minimum receiver sensitivity of the mobile terminal, it is impossible to carry out the communication between the leaky coaxial cable and the mobile terminal located at such a point. On the other hand, in the radio communication system 10, even if the intensity of the signals transmitted from the base station 11 and propagating through the leaky coaxial cable 12 is lower than the minimum receiver sensitivity of the mobile terminal 14, it is possible to carry out the communication by using the signals (with the frequency $f_2$) transmitted from the first repeater 13a and propagating through the leaky coaxial cable 12.

(Effects of the First Embodiment)

Accordingly, if the intensity of the signals transmitted from the base station 11 is same as the intensity of the signals in the conventional radio communication system and the intensity of the signals transmitted from the base station 11 is same as the intensity of the signals transmitted from the first repeater 13a, a distance between the repeaters can be increased by about 2 times compared with the distance between the repeaters in the conventional radio communication system. Therefore, if the transmission distance is same as that in the conventional radio communication system, the number of the repeaters can be reduced to about ½ of the conventional system, thereby further reducing the cost.

The Second Embodiment

A radio communication system in the second embodiment according to the present invention will be explained below. Herein, the similar reference numerals (including the reference numeral in which the suffix is changed) are assigned to members having the similar function in the radio communication system 10 in the first embodiment, and the detailed explanations of which are omitted.

(A Radio Communication System 40)

Figure 4:
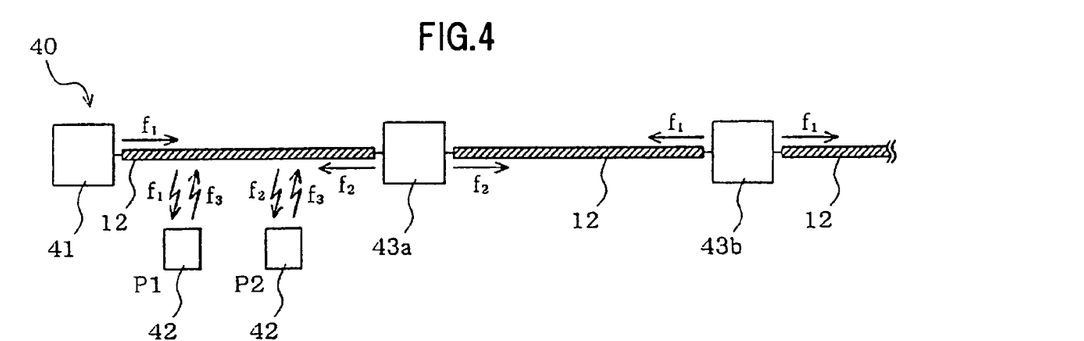
FIG. 4 is a block diagram showing a structure of a radio communication system in the second embodiment according to the present invention.

Referring to FIG. 4, a radio communication system 40 in the second embodiment enables bi-directional communication by Frequency Division Duplex (FDD) between the base station 41 and a mobile terminal 42.

The base station 41 comprises a receiver which receivers signals (e.g. signals with a frequency f3) in addition to the transmitter. The communication is carried out between the transmitter, the receiver and the mobile terminal 42 via the leaky coaxial cable 12 and the first and second repeaters 43a, 43b.

The mobile terminal 42 has a receiving and transmitting function for converting the received signal into a base band signal, and transmitting signals with a frequency different from the frequency of the repeated signal.

When signals transmitted from the mobile terminal 42 are input to each of the first and second repeaters 43a, 43b, each of the first and second repeaters 43a, 43b outputs the input signals to the leaky coaxial cable 12 on the side of the base station 41.

Namely, the radio communication system 40 in the second embodiment is different from the radio communication system 10 in the first embodiment in the structure of the base station 41, the mobile terminal 42 and the first and second repeaters 43a, 43b.

(The First and Second Repeaters 43a, 43b)

Figure 5:
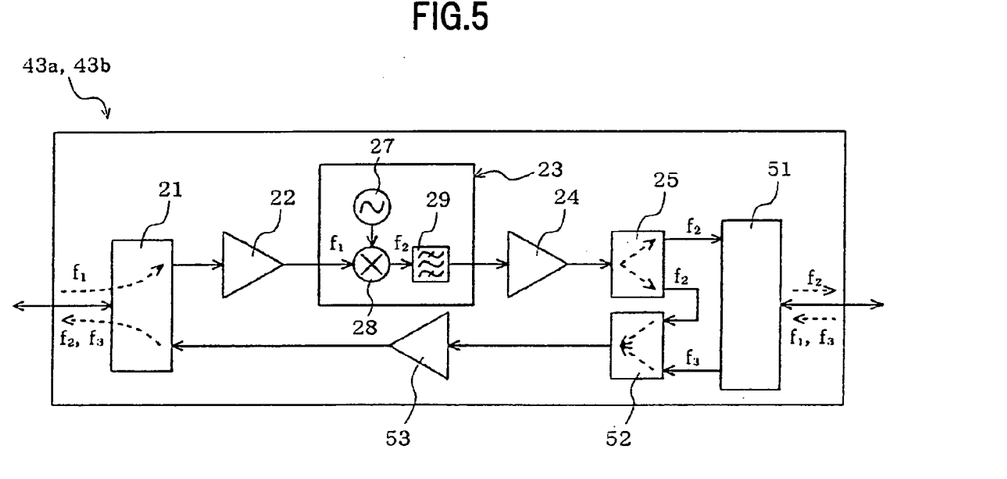
FIG. 5 is a circuitry diagram showing a structure of a repeater in the radio communication system of FIG. 4.

Referring to FIG. 5, each of the first and second repeaters 43a, 43b comprises a duplexer (first duplexer) 21 connected to the leaky coaxial cable 12 on the side of the base station 41, an amplifier (first amplifier) 22 connected to the duplexer 21, a heterodyne circuit 23 connected to the amplifier 22, an amplifier (second amplifier) 24 connected to the heterodyne circuit 23, and a power divider 25 connected to the amplifier 24, a duplexer 51 connected to one output port of the power divider 25, a power combiner 52 connected to another output port of the power divider 25 and to the duplexer 51, and an amplifier (third amplifier) 53 connected to the power combiner 52.

The duplexer 51 electrically separates the signals input from the leaky coaxial cable 12 on the side of the repeater at the post-stage from the signals output to the leaky coaxial cable 12 on the side of the repeater at the post-stage.

The power combiner 52 synthesizes signals supplied from two paths. The amplifier 53 amplifies the input signal at a predetermined amplification rate and outputs the amplified signal. The output port of the amplifier 53 is connected to the duplexer 21.

In each of the first and second repeaters 43a, 43b, when the signals transmitted from the base station 41 or the repeater at the pre-stage are input to each of the first and second repeaters 43a, 43b, the input signal is separated by the duplexer 21 and amplified by the amplifier 22, and the frequency of the amplified signal is converted into the different frequency by the heterodyne circuit 23. The frequency-converted signal is amplified by the amplifier 24 and divided by the power divider 25. One part of the divided signals is output to the leaky coaxial cable 12 on the side of the base station 41 connected to the repeater 43a via the power combiner 52, the amplifier 53, and the duplexer 21, while another part of the divided signals is output to the leaky coaxial cable 12 on the side of the repeater at the post-stage, which is connected to the second repeater 43b, via the duplexer 51.

For example, when the signal transmitted from the base station 41 is input to the first repeater 43a, the first repeater 43a converts a frequency $f_1$ of the input signal into a frequency f2, and outputs the signal with the frequency $f_2$ to the leaky coaxial cable 12 on the side of the base station 41 connected to the first repeater 43a and to the leaky coaxial cable 12 on the side of the repeater 43b at the post-stage, respectively.

On the other hand, when the signal transmitted from the repeater 43a at the pre-stage is input to the second repeater 43b, the second repeater 43b converts the frequency $f_2$ of the input signal into the frequency $f_1$, and outputs the signal with the frequency $f_1$ to the leaky coaxial cable 12 on the side of the repeater 43a at the pre-stage connected to the second repeater 43b and to the leaky coaxial cable 12 on the side of the repeater at the post-stage, respectively.

Further, when the signal transmitted from the mobile terminal 42 is input to each of the first and second repeaters 43a, 43b, each of the first and second repeaters 43a, 43b separates the input signal at the duplexer 51, and outputs the signals to the leaky coaxial cable 12 on the side of the base station 41, via the power combiner 52, the amplifier 53, and the duplexer 21.

For example, when the signal transmitted from the mobile terminal 42 is input to the first repeater 43a, the first repeater 43a outputs the transmitted signal to the leaky coaxial cable 12 on the side of the base station 41 without converting a frequency f3 of the input signal.

On the other hand, when the signal transmitted from the mobile terminal 42 is input to the second repeater 43b, the second repeater 43b outputs the transmitted signal to the leaky coaxial cable 12 on the side of the repeater 43a at the post-stage (i.e. the leaky coaxial cable 12 on the base station 41) without converting a frequency $f_3$ of the input signals.

In other words, the first and second repeaters 43a, 43b alternately convert the signals transmitted from the base station 41 into the frequencies $f_1$ and $f_2$ and repeat the converted signals, while repeat the signals transmitted from the mobile terminal 42 to the base station 41 without converting the frequency.

The frequency $f_1$ and the frequency $f_2$ in FIG. 5 respectively indicate the frequency in each place in the first repeater 43a. In the second repeater 43b, the frequency of the input signal and the frequency of the output signal are opposite to those in the first repeater 43a. In other words, the frequencies $f_1$ and $f_2$ are opposite to the frequencies $f_1$ and $f_2$ in FIG. 5, while the frequency $f_3$ remains unchanged.

(The Mobile Terminal 42)

Figure 6:
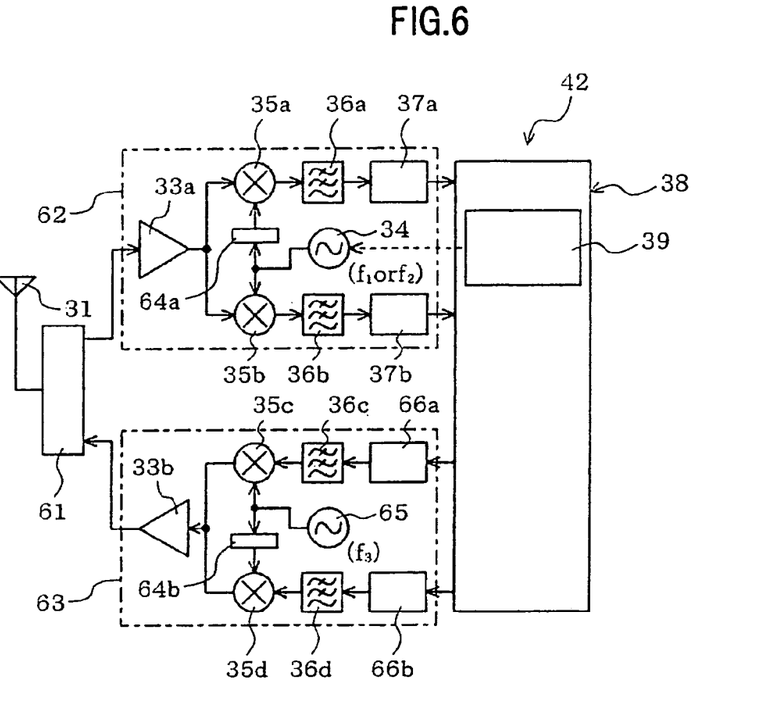
FIG. 6 is a circuitry diagram showing a structure of a mobile terminal in the radio communication system of FIG. 4.

Referring to FIG. 6, the mobile terminal 42 comprises an antenna 31, a duplexer 61 connected to the antenna 31, a receiving circuit 62 connected to the duplexer 61, a transmitting circuit 63 connected to the duplexer 61, and a base band unit 38 connected to the receiving circuit 62 and the transmitting circuit 63. The duplexer 61 electrically separates the signal input from the antenna 31 from the signal output to the antenna 31.

The receiving circuit 62 carries out the orthogonal modulation on the received signals. The receiving circuit 62 comprises an amplifier 33a connected to the duplexer 61, a local oscillator 34, a π/2 phase shifter 64a connected to the local oscillator 34, a mixer 35a to which signals are input from the amplifier 33a and the π/2 phase shifter 64, a mixer 35b to which signals are input from the amplifier 33a and the local oscillator 34, low pass filters 36a, 36b to which the signals are input from the mixers 35a, 35b, respectively, and A/D converters 37a, 37b connected to the low pass filters 36a, 36b, respectively.

The π/2 phase shifter 64a provides the signal supplied from the local oscillator 34 with a phase difference of π/2.

The transmitting circuit 63 carries out the orthogonal modulation on the signals to be transmitted. The transmitting circuit 63 comprises an amplifier 33b connected to the duplexer 61, a local oscillator 65, a π/2 phase shifter 64b connected to the local oscillator 65, a mixer 35c to which signals are input from the π/2 phase shifter 64b, low pass filters 36c, 36d connected to the mixers 35c, 35d, and D/A converters 66a, 66b connected to the low pass filters 36c, 36d, respectively.

The local oscillator 65 generates signals with a specific local frequency. The π/2 phase shifter 64b provides the signals from the local oscillator 65 with a phase difference of π/2. The D/A converters 66a, 66b convert input analog signals into digital signals, respectively.

In the mobile terminal 42, the signals received by the antenna 31 are separated by the duplexer 61 and amplified by the amplifier 33a. The amplified signals are converted into the base band signals by the local oscillator 34, the π/2 phase shifter 64a, and the mixers 35a, 35b. The noise is removed from the base band signals by the low pass filters 36a, 36b. Thereafter, the base band signals are converted into the digital signals by the A/D converters 37a, 37b, and the digital signals are processed by the base band unit 38.

For example, the mobile terminal 42 takes out only the signals with the frequencies $f_1$ and $f_2$, and converts the taken-out signals to the base band signals. Further, a certain processing is carried out based on the base band signals.

Further, in the mobile terminal 42, the digital signals transmitted from the base band unit 38 are converted into analog signals by the D/A converters 66a, 66b, respectively. The noise is removed from the analog signals by the low pass filters 36c, 36d. The analog signals are converted into the signals with a specific frequency by the local oscillator 65, the π/2 phase shifter 64b and the mixers 35c, 35d. Thereafter, the signals with the specific frequency are amplified by the amplifier 33b and separated by the duplexer 61 to be transmitted by the antenna 31.

For example, the mobile terminal 42 converts the frequency of the base band signal into the frequency $f_3$ and transmits the signals with the frequency $f_3$.

(Effects of the Second Embodiment)

According to the radio communication system 40 in the second embodiment, similarly to the radio communication system 10 in the first embodiment, it is possible to reduce the number of the repeaters by increasing the connection interval of the repeaters, thereby reducing the cost. Further, it is possible to realize the bi-directional communication by the FDD between the base station 41 and the mobile terminal 42.

The Third Embodiment

A radio communication system in the third embodiment according to the present invention will be explained below. Herein, the similar reference numerals (including the reference numeral in which the suffix is changed) are assigned to members having the similar function in the radio communication system 10 in the first embodiment and the radio communication system 40 in the second embodiment, and the detailed explanations of which are omitted.

(A Radio Communication System 70)

Figure 7:
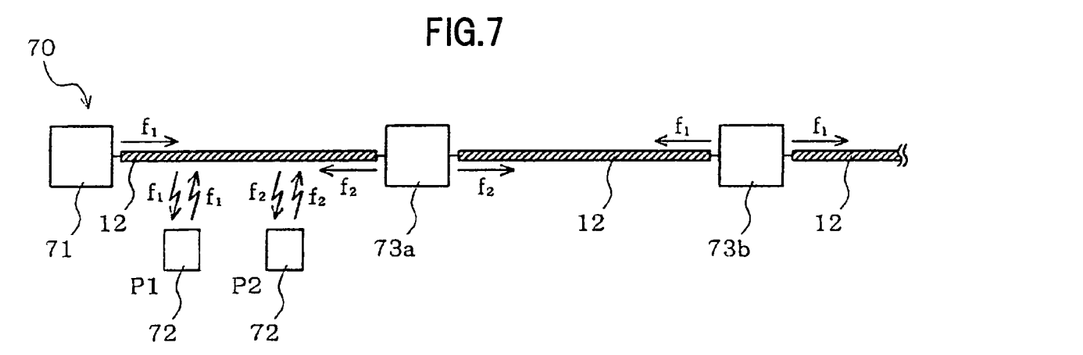
FIG. 7 is a block diagram showing a structure of a radio communication system in the third embodiment according to the present invention.

Referring to FIG. 7, a radio communication system 70 in the third embodiment repeats signals enables bi-directional communication by Time Division Duplex (TDD) between a base station 71 and a mobile terminal 72.

The base station 71 comprises a receiver which receives signals (e.g. signals with frequency $f_1$ or $f_2$) in addition to the transmitter. The communication is carried out between the transmitter, the receiver and the mobile terminal 72 via the leaky coaxial cable 12 and the first and second repeaters 73a, 73b.

The mobile terminal 72 has a receiving and transmitting function for converting a received signal into a base band signal, and transmitting a signal with the same frequency as the frequency of the received signal.

When signals transmitted from the mobile terminal 72 are input to each of the first and second repeaters 73a, 73b, each of the first and second repeaters 73a, 73b converts a frequency of the input signal into a different frequency, and outputs a frequency-converted signal to the leaky coaxial cable 12 on the side of the base station 71.

Namely, the radio communication system 70 in the third embodiment is basically different from the radio communication system 10 in the first embodiment in the structure of the base station 71, the mobile terminal 72 and the first and second repeaters 73a, 73b.

(The First and Second Repeaters 73a, 73b)

Figure 8:
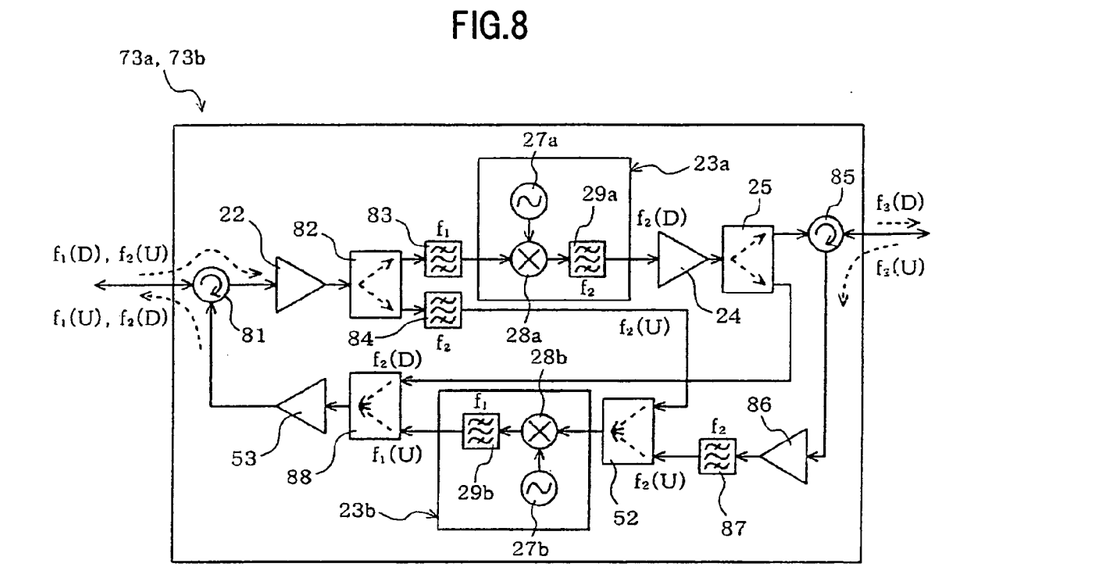
FIG. 8 is a circuitry diagram showing a structure of a repeater in the radio communication system of FIG. 7.

Referring to FIG. 8, each of the first and second repeaters 73a, 73b comprises a circulator (first circulator) 81 connected to the leaky coaxial cable 12 on the side of the base station 71, an amplifier (first amplifier) 22 connected to the circulator 81, a power divider (first power divider) 82 connected to the amplifier 22, a band pass filter (first band pass filter) 83 connected to one output port of the power divider 82, a band pass filter (second band pass filter) 84 connected to another output port of the power divider 82, a heterodyne circuit (first heterodyne circuit) 23a connected to the band pass filter 83, an amplifier (second amplifier) 24 connected to the heterodyne circuit 23a, a circulator (second circulator) 85 connected to one output port of the power divider 25, an amplifier (third amplifier) 86 connected to the circulator 85, a band pass filter (third band pass filter) 87 connected to the amplifier 86, a power combiner (first power combiner) 52 connected to the band pass filter 84 and the band pass filter 87, a heterodyne circuit (second heterodyne circuit) 23b connected to the power combiner 52, a power combiner (second power combiner) 88 connected to the heterodyne circuit 23b and another output port of the power divider 25, and an amplifier 53 having an input port connected to the power combiner 88 and an output port connected to the circulator 81.

The circulator 81 outputs the signal input from the leaky coaxial cable 12 on the side of the base station 71 to the amplifier 22 and outputs the signal input from the amplifier 53 to the leaky coaxial cable 12 on the side of the base station 71. The circulator 85 outputs the signal input from the power divider 25 to the leaky coaxial cable 12 on the side of the repeater at the post-stage and outputs the signal input from the leaky coaxial cable 12 on the side of the repeater at the post-stage to the amplifier 86.

The power divider 82 divides the input signal into two paths and outputs divided signals through two paths. Each of the band pass filters 83, 84, 87 removes the signals with the unnecessary frequencies, and passes only the signals with a specific frequency. The amplifier 86 amplifies the input signals at a predetermined amplification rate and outputs the amplified signals. The power combiner 88 synthesizes the signals supplied from two paths.

In each of the first and second repeaters 73a, 73b, when the signal transmitted from the base station 71 or the repeater at the pre-stage is input to each of the first and second repeaters 73a, 73b, the input signal is output to the amplifier 22 via the circulator 81. The signal amplified by the amplifier 22 is divided by the power divider 82. The signal with the specific frequency is taken out from one part of the divided signals by the band pass filter 83, and the frequency of the taken-out signals is converted into the different frequency by the heterodyne circuit 23a. The signal with the specific frequency is taken out from another part of the divided signals by the band pass filter 84, and output to the power combiner 52. The signal with the frequency converted by the heterodyne circuit 23a is amplified by the amplifier 24 and divided by the power divider 25. One part of the divided signals is output to the leaky coaxial cable 12 on the side of the base station 71 via the power combiner 88, the amplifier 53, and the circulator 81, while another part of the divided signals is output to the leaky coaxial cable 12 on the side of the repeater at the post-stage, which is connected to the first and second repeaters 73a, 73b, via the circulator 81.

For example, when the signal transmitted from the base station 71 is input to the first repeater 73a, the first repeater 73a converts the frequency f1 of the input signal into the frequency f2, and outputs the signal with the frequency f2 to the leaky coaxial cable 12 on the side of the base station 71 connected to the first repeater 73a and to the leaky coaxial cable 12 on the side of the repeater 73b at the post-stage, respectively.

On the other hand, when the signal transmitted from the repeater 73a at the pre-stage is input to the second repeater 73b, the second repeater 73b converts the frequency f2 of the input signal into the frequency f1, and outputs the signal with the frequency f1 to the leaky coaxial cable 12 on the side of the repeater 73a at the pre-stage connected to the second repeater 73b and to the leaky coaxial cable 12 on the side of the repeater at the post-stage, respectively.

Further, when the signals transmitted from the mobile terminal 72 are input to each of the first and second repeaters 73a, 73b, the input signals are output to the amplifier 86 via the circulator 85. The signal is amplified by the amplifier 86. The signal with the specific frequency is taken out from the amplified signals by the band pass filter 87, and the signal with the specific frequency is synthesized with the signal input from the band pass filter 84 by the power combiner 52.

The frequency of the synthesized signal is converted into the different frequency by the heterodyne circuit 23b. The frequency-converted signals are synthesized with the signal input from the power divider 25 by the power combiner 88, and amplified by the amplifier 53. The amplified signal is output to the leaky coaxial cable 12 on the side of the base station 71 via the circulator 81.

For example, when the signal transmitted from the mobile terminal 72 is input to the first repeater 73a, the first repeater 73a converts the frequency f1 of the input signal into the frequency f1, and outputs the signal with the frequency f1 to the leaky coaxial cable 12 on the side of the base station 71.

On the other hand, when the signal transmitted from the mobile terminal 72 is input to the second repeater 73b, the second repeater 73b converts the frequency $f_1$ of the input signal into the frequency $f_2$, and outputs the signal with the frequency $f_2$ to the leaky coaxial cable 12 on the side of the repeater 73b at the pre-stage.

In other words, the first and second repeaters 73a, 73b alternately convert the signals transmitted from the base station 71 into the frequencies $f_1$ and $f_2$ and repeat the frequency-converted signals. Further, the first and second repeaters 73a, 73b alternately convert the signals transmitted from the mobile terminal 72 into the frequencies $f_1$ and $f_2$ and repeat the frequency-converted signals toward the base station 71.

The frequency $f_1$ and the frequency $f_2$ in FIG. 8 respectively indicate the frequency in each place in the first repeater 73a. More particularly, $f_x(U)$ indicates an uplink signal (i.e. a signal from the mobile terminal 72 to the base station 71) at a frequency $f_x$, and $f_x(D)$ indicates a downlink signal (i.e. a signal from the base station 71 to the mobile terminal 72) at a frequency $f_f$. In the second repeater 73b, the frequency of the input signal and the frequency of the output signal are opposite to those in the first repeater 73a. In other words, the frequencies $f_1$ and $f_2$ are opposite to the frequencies $f_1$ and $f_2$ in FIG. 8.

(The Mobile Terminal 72)

Figure 9:
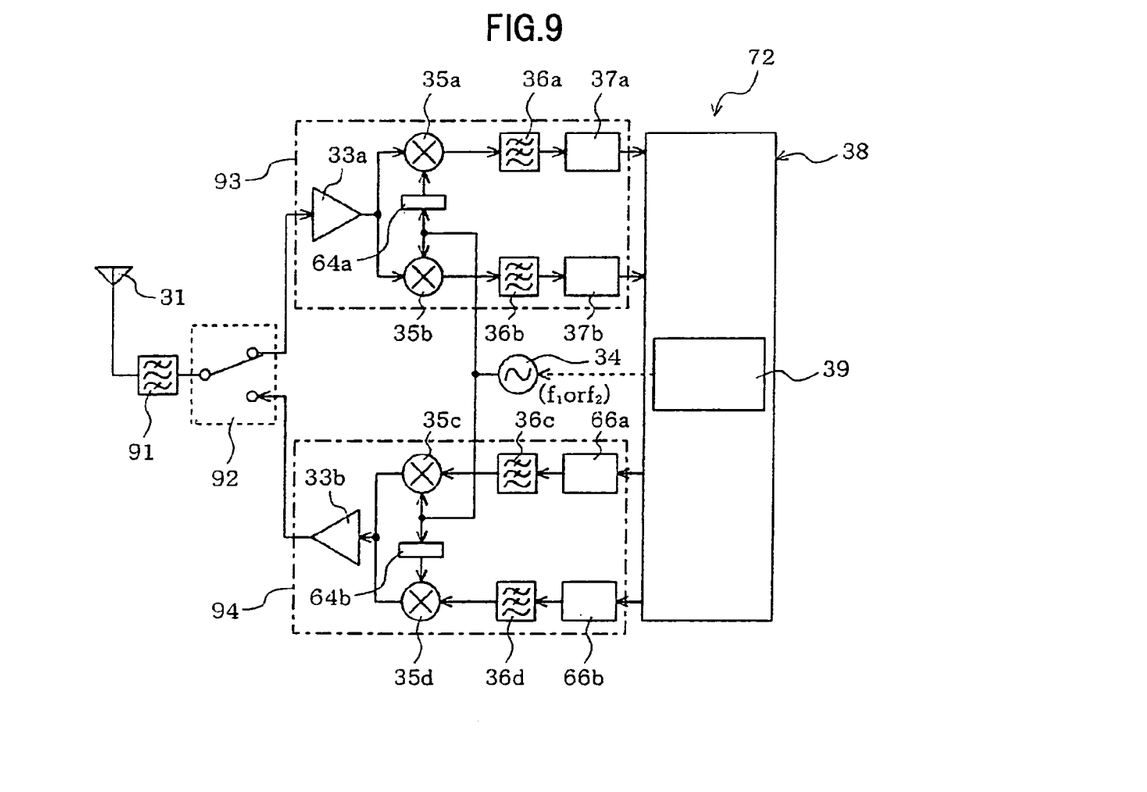
FIG. 9 is a circuitry diagram showing a structure of a mobile terminal in the radio communication system of FIG. 7.

Referring to FIG. 9, the mobile terminal 72 comprises an antenna 31, a band pass filter 91 connected to the antenna 31, a switch 92 connected to the band pass filter 91, a receiving circuit 93 connected to the switch 92, a transmitting circuit 94 connected to the switch 92, and a base band unit 38 connected to the receiving circuit 93 and the transmitting circuit 94.

The band pass filter 91 removes the signals with unnecessary frequencies and passes only the signal with the specific frequency. The switch 92 switches a path between the band pass filter 91 and the receiving circuit 93 or a path between the band pass filter 91 and the transmitting circuit 94.

Each of the receiving circuit 93 and the transmitting circuit 94 has a structure similar to each of the receiving circuit 62 and the transmitting circuit 63 in the radio communication system 40 in the second embodiment except that the local frequency for both the receiving circuit 93 and the transmitting circuit 94 is generated by the local oscillator 34.

In the mobile terminal 72, the signal received by the antenna 31 is amplified by the amplifier 33a. The amplified signal is converted into the base band signal by the local oscillator 34, the π/2 phase shifter 64a and the mixers 35a, 35b, respectively. The noise is removed from the base band signal by the low pass filters 36a, 36b, respectively. Thereafter, the base band signals are converted into the digital signals by the A/D converters 37a, 37b, and the digital signals are processed by the base band unit 38.

For example, the mobile terminal 72 takes out only the signals with the frequencies $f_1$ and $f_2$, and converts the taken-out signals with the frequencies $f_1$ and $f_2$ to the base band signals. Further, a certain processing is carried out based on the base band signals.

Further, in the mobile terminal 72, the signals transmitted from the base band unit 38 are converted into analog signals by the D/A converters 66a, 66b. The noise is removed from the analog signals by the low pass filters 36c, 36d. The analog signals are converted into the signals with the frequency same as that of the received signal by the local oscillator 65, the π/2 phase shifter 64b and the mixers 35c, 35d. Thereafter, the frequency-converted signals are amplified by the amplifier 33b and switched by the switch 92 to be transmitted from the antenna 31.

For example, when the mobile terminal 72 transmits the signals at the point $P_1$, the mobile terminal 72 converts the frequency of the base band signal into the frequency $f_1$ and transmits the signals from the antenna 31. Further, when the mobile terminal 72 transmits the signals at the point $P_2$, the mobile terminal 72 converts the frequency of the base band signal into the frequency $f_2$ and transmits the signals from the antenna 31.

(Effects of the Third Embodiment)

According to the radio communication system 70 in the third embodiment, similarly to the radio communication system 10 in the first embodiment and the radio communication system 40 in the second embodiment, it is possible to reduce the number of the repeaters by increasing the connection interval of the repeaters, thereby reducing the cost. Further, it is possible to realize the bi-directional communication by the TDD between the base station 71 and the mobile terminal 72.

The embodiments as described above are merely examples for embodying the present invention, and the circuit structure of the repeater and the mobile terminal are not limited thereto.

Although the invention has been described, the invention according to claims is not to be limited by the above-mentioned embodiments and examples. Further, please note that not all combinations of the features described in the embodiments and the examples are not necessary to solve the problem of the invention.

What is claimed is:

1. A repeater repeating a signal for a communication between a base station and a mobile terminal, which is provided between leaky coaxial cables connected in series from the base station, the repeater comprising:
   a first duplexer connected to a base station side leaky coaxial cable, which electrically separates an input signal from the base station side leaky coaxial cable from a signal to be output to the base station side leaky coaxial cable;
   a first amplifier connected to the first duplexer;
   a frequency-converting circuit connected to the first amplifier, which converts a frequency of an input signal into a different frequency and outputs a frequency-converted signal;
   a second amplifier connected to the frequency-converting circuit; and
   a power divider connected to the second amplifier, which divides an input signal and outputs divided signals to plural paths including a path to the first duplexer,
   wherein the repeater converts a frequency of the input signal from the base station side leaky coaxial cable into a different frequency, and outputs a frequency-converted signal to the base station side leaky coaxial cable.

2. The repeater according to claim 1, further comprising:
   a second duplexer connected to an output port of the power divider, which electrically separates an input signal from a leaky coaxial cable on a side of a repeater at a post-stage from a signal to be output to the leaky coaxial cable on the side of the repeater at the post-stage;

a power combiner connected to an other output port of the power divider, which synthesizes signals supplied from the plural paths; and a third amplifier connected to the power combiner, which amplifies an input signal and outputs to an amplified signal to the first duplexer.

3. The repeater according to claim 2, wherein the second duplexer is connected to an input port of the power combiner, the second duplexer separates an input signal to the mobile terminal and an output signal from the mobile terminal, and the second duplexer outputs the separated signal to the leaky coaxial cable on the side of the base station without converting a frequency of the input signal via the power combiner, the third amplifier and the first duplexer.

4. A repeater repeating a signal for a communication between a base station and a mobile terminal, which is provided between leaky coaxial cables connected in series from the base station, converts a frequency of an input signal from a base station side leaky coaxial cable to a different frequency, and outputs the frequency-converted signal to the base station side leaky coaxial cable, the repeater comprising:

a first circulator connected to the base station side leaky coaxial cable;

a first amplifier connected to the first circulator;

a first power divider connected to the first amplifier, which divides an input signal and outputs divided signals to plural paths;

a first frequency-converting circuit connected to an output port of the first power divider, which converts a frequency of an input signal into a different frequency and outputs a frequency-converted signal;

a second amplifier connected to the first frequency-converting circuit;

a second power divider connected to the second amplifier, which divides an input signal and outputs divided signals to the plural paths;

a second circulator connected to an output port of the second power divider;

a first power combiner connected to the second circulator and an other output port of the first power divider, which synthesizes signals supplied from the plural paths;

a second frequency-converting circuit connected to the first power combiner, which converts a frequency of an input signal into a different frequency and outputs a frequency-converted signal;

a second power combiner connected to the second frequency-converting circuit and an other output port of the second power divider, which synthesizes signals supplied from the plural paths; and a third amplifier having an input port connected to the second power combiner and an output port connected to the first circulator.

5. The repeater according to claim 4, further comprising: a fourth amplifier connected between the second circulator and the first power combiner.

6. The repeater according to claim 5, wherein the first circulator outputs the signal input from the leaky coaxial cable on the side of the base station to the first amplifier and outputs the signal input from the third amplifier to the leaky coaxial cable on the side of the base station, and the second circulator outputs the signal input from the second power divider to the leaky coaxial cable on the side of the repeater at the post-stage and outputs a signal input from the leaky coaxial cable on the side of the repeater at the post-stage to the fourth amplifier.

7. The repeater according to claim 6, wherein the repeater converts a frequency of a signal to be transmitted from the mobile terminal to the base station, which is input from the leaky coaxial cable, into a different frequency and outputs a frequency-converted signal, and the repeater converts a frequency of a signal to be transmitted from the base station to the mobile terminal into a different frequency and outputs a frequency-converted signal.

\* \* \* \* \*